United States Patent
Nakajima et al.

(10) Patent No.: US 10,573,340 B2
(45) Date of Patent: Feb. 25, 2020

(54) INFORMATION REPRODUCTION APPARATUS AND INFORMATION REPRODUCTION METHOD

(71) Applicant: NIDEC SANKYO CORPORATION, Nagano (JP)

(72) Inventors: Shigeo Nakajima, Nagano (JP); Katsuhisa Higashi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/337,403

(22) PCT Filed: Sep. 22, 2017

(86) PCT No.: PCT/JP2017/034182
§ 371 (c)(1),
(2) Date: Mar. 28, 2019

(87) PCT Pub. No.: WO2018/061995
PCT Pub. Date: May 4, 2018

(65) Prior Publication Data
US 2019/0279674 A1    Sep. 12, 2019

(30) Foreign Application Priority Data
Sep. 29, 2016    (JP) .................................. 2016-192176

(51) Int. Cl.
*G11B 5/00* (2006.01)
*G11B 5/596* (2006.01)
(Continued)

(52) U.S. Cl.
CPC ...... *G11B 5/59611* (2013.01); *G11B 5/00808* (2013.01); *G11B 5/09* (2013.01);
(Continued)

(58) Field of Classification Search
CPC ....... G11B 5/09; G11B 20/1009; G11B 20/14; G11B 20/1403; G11B 20/1419;
(Continued)

(56) References Cited

U.S. PATENT DOCUMENTS 7,639,442 B2 * 12/2009 Hashizume .............. G11B 5/56
360/31

FOREIGN PATENT DOCUMENTS

| JP | S6288108 | 4/1987 |
| JP | H02198008 | 8/1990 |
| JP | 2013-211083 | 10/2013 |

OTHER PUBLICATIONS

"International Search Report (Form PCT/ISA/210) of PCT/JP2017/034182," dated Nov. 7, 2017, with English translation thereof, pp. 1-4.

* cited by examiner

*Primary Examiner* — Nabil Z Hindi
(74) *Attorney, Agent, or Firm* — JCIPRNET

(57) ABSTRACT

The card reader includes a peak detector that detects a peak point of a reproduced signal according to a threshold. The peak detector applies, to a first peak value to be determined, a second peak value immediately before the first peak value, a third peak value, which is the second preceding peak value with respect to the first peak value, and a next peak value. When a difference between a first intermediate value, which is a value between the third peak value and the second peak value, and a second intermediate value, which is a value between the second peak value and the first peak value, is greater than or equal to a first difference value, the peak detector ignores a first threshold, and decides the first peak value after confirming that a digital value corresponding to the next peak value has exceeded a second threshold.

8 Claims, 10 Drawing Sheets

(51) Int. Cl.
*G11B 5/008* (2006.01)
*G11B 5/09* (2006.01)
*G11B 5/80* (2006.01)
*G11B 20/10* (2006.01)
*G11B 20/14* (2006.01)

(52) U.S. Cl.
CPC ................ *G11B 5/80* (2013.01); *G11B 20/10* (2013.01); *G11B 20/10037* (2013.01); *G11B 20/14* (2013.01)

(58) Field of Classification Search
CPC ....... G11B 5/00; G11B 5/92; G11B 20/10009; G11B 27/36; G11B 20/10; G11B 5/02; G11B 20/10027; G06K 7/084; H04L 27/1563

See application file for complete search history.

INFORMATION REPRODUCTION APPARATUS AND INFORMATION REPRODUCTION METHOD

CROSS-REFERENCE TO RELATED APPLICATION

This application is a 371 application of the International PCT application serial no. PCT/JP2017/034182, filed on Sep. 22, 2017, which claims priority benefits of Japan Patent Application No. 2016-192176 filed on Sep. 29, 2016. The entirety of each of the abovementioned patent applications is hereby incorporated by reference herein and made a part of this specification.

TECHNICAL FIELD

The present invention relates to an information reproduction apparatus and an information reproduction method for reproducing recorded information recorded in a predetermined format (modulation scheme).

BACKGROUND ART

For example, an information reproduction apparatus (magnetic regeneration circuit), which is applied to a magnetic card reader/writer, etc., that reads F and 2F signals for "0" and "1" signals which have been magnetically recorded by a frequency modulation method, mainly includes the structures as stated below.

In the information reproduction apparatus, a signal (information) recorded on a magnetic card is reproduced by a magnetic head, a peak point is detected by a peak detection circuit after the reproduced signal (an analog waveform) has been amplified by an amplifier circuit, and an output signal is inverted at the peak point so that the signal is shaped to have a waveform of a rectangular wave signal. The rectangular wave signal is a signal subjected to a frequency modulation (F2F modulation), and is demodulated by an F2F demodulating circuit.

However, in peak detection by an analog method, in order to read a card with a large amount of noises and a demagnetized card of low output, a circuit needs to be switched for reading of such cards. Thus, there is a disadvantage that the size of the circuit is increased and the cost is also increased. Also, since the circuit needs to be switched, it is necessary to test a plurality of methods to achieve the reading, and the reading time is increased.

In view of the above, an information reproduction apparatus in which digital peak detection is adopted, and which is adaptable to a recording medium (magnetic card) with varied output without switching a circuit, and is capable of suppressing an increase in the size of the circuit and the cost, and also reducing the reading time has been proposed (for example, refer to Patent Literature 1).

CITATION LIST

Patent Literature

[Patent Literature 1] Japanese Unexamined Patent Application Publication No. 2013-211083

SUMMARY OF THE INVENTION

Problems to be Solved by the Invention

In the information reproduction apparatus described in Patent Literature 1 stated above, a threshold of peak detection can be changed automatically according to an output level of a digital signal. Thus, there is no need to switch a circuit, which means that the size of the circuit can be reduced, and the cost can be reduced. In addition, since it is possible to deal with both the card with a large amount of noises and the card which has been demagnetized by a one-time read, reading time can be reduced.

However, in the information reproduction apparatus described in Patent Literature 1, in a demagnetized card or the like, when a gain is suddenly increased due to automatic gain control (AGC) of an amplifier, the gain is also applied to an offset voltage of the amplifier. Consequently, the offset voltage is increased. Also, in a case where vertical symmetry of the waveform is deteriorated when a head touch is poor as in a curved card having a curve, the offset voltage is changed. In such a case, as in the information reproduction apparatus described in Patent Literature 1, when a peak is to be detected with two stages of thresholds, since the offset voltage is changed, a deviation between a first-stage threshold and a second-stage threshold becomes large. Thus, there is a possibility of not being able to perform the peak detection.

In view of the above problem, an object of the present invention is to provide an information reproduction apparatus and an information reproduction method capable of maintaining peak detection capability even in a case where the offset voltage changes.

Means for Solving the Problem

In order to resolve the above problem, an information reproduction apparatus of the present invention is characterized by including: an analog-to-digital (AD) converter which reproduces information recorded on a magnetic recording medium, and converts an analog signal amplified by a predetermined gain into a digital signal; a peak detector which detects a peak point of a reproduced signal according to a threshold, which is a determination level made to conform to an output of the AD converter from the digital signal; and an information generation unit which generates a rectangular wave signal of the reproduced signal subjected to waveform shaping performed in accordance with interval information on peak points detected by the peak detector, in which the peak detector includes a first intermediate value acquisition unit which applies, to a first peak value to be determined, a second peak value immediately before the first peak value, a third peak value, which is the second preceding peak value with respect to the first peak value, and a next peak value, and obtains a first intermediate value between the third peak value and the second peak value; a second intermediate value acquisition unit which obtains a second intermediate value between the second peak value and the first peak value; a first correction value acquisition unit which obtains a first correction value obtained by multiplying a difference between the third peak value and the second peak value by a predetermined ratio based on the difference; a first threshold acquisition unit which obtains a first threshold by adding the first correction value to the first intermediate value; a second correction value acquisition unit which obtains a second correction value obtained by multiplying a difference between the second peak value and the first peak value by a predetermined ratio based on the difference; a second threshold acquisition unit which obtains a second threshold by adding the second correction value to the second intermediate value; and a peak value decision unit which ignores the first threshold when a difference between the first intermediate value and the second intermediate value is greater than or equal to a first difference value, and decides the first peak value after confirming that a digital value corresponding to the next peak value has exceeded the second threshold.

In the present invention, it becomes possible to maintain the peak detection capability even in a case where the gain is suddenly increased due to the automatic gain control (AGC) in a demagnetized card, for example, or when the vertical symmetry of the waveform is deteriorated due to a poor head touch in a curved card, for example, whereby the offset voltage is changed.

In the present invention, the peak value decision unit of the peak detector should preferably decide the first peak value after confirming that the digital value corresponding to the second peak value has exceeded the first threshold, and the digital value corresponding to the next peak value has exceeded the second threshold, when the difference between the first intermediate value and the second intermediate value is within the first difference value.

In this way, also in a card (recording medium, etc.) with a large amount of noises, it becomes possible to reproduce information by reliable handling.

In the present invention, when a difference between the digital value and the extreme value is not greater than a second difference value, which is smaller than the first difference value, the peak value decision unit of the peak detector does not determine the digital value as the peak value even if the digital value exceeds the threshold.

Consequently, it becomes possible to prevent a noise from being erroneously detected when an output change of AD conversion is small.

Also, an information reproduction method of the present invention is characterized by including: an analog-to-digital (AD) conversion step of reproducing information recorded on a magnetic recording medium, and converting an analog signal amplified by a predetermined gain into a digital signal; a peak detection step of detecting a peak point of a reproduced signal according to a threshold, which is a determination level made to conform to an output of the AD conversion step from the digital signal; and an information generation step of generating a rectangular wave signal of the reproduced signal subjected to waveform shaping performed in accordance with interval information on the peak points detected by the peak detection step, in which the peak detection step includes: applying, to a first peak value to be determined, a second peak value immediately before the first peak value, a third peak value, which is the second preceding peak value with respect to the first peak value, and a next peak value; obtaining a first intermediate value between the third peak value and the second peak value; obtaining a second intermediate value between the second peak value and the first peak value; obtaining a first correction value obtained by multiplying a difference between the third peak value and the second peak value by a predetermined ratio based on the difference; obtaining a first threshold by adding the first correction value to the first intermediate value; obtaining a second correction value obtained by multiplying a difference between the second peak value and the first peak value by a predetermined ratio based on the difference; obtaining a second threshold by adding the second correction value to the second intermediate value; and ignoring the first threshold when a difference between the first intermediate value and the second intermediate value is greater than or equal to a first difference value, and deciding the first peak value after confirming that a digital value corresponding to the next peak value has exceeded the second threshold.

In the present invention, it becomes possible to maintain the peak detection capability even in a case where the gain is suddenly increased due to the AGC in a demagnetized card, for example, or when the vertical symmetry of the waveform is deteriorated due to a poor head touch in a curved card, for example, whereby the offset voltage is changed.

In the present invention, in the peak detection step, the first peak value is decided after confirming that the digital value corresponding to the second peak value has exceeded the first threshold, and the digital value corresponding to the next peak value has exceeded the second threshold, when the difference between the first intermediate value and the second intermediate value is within the first difference value.

In this way, also in a card (recording medium, etc.) with a large amount of noises, for example, it becomes possible to reproduce information by reliable handling.

In the present invention, in the peak detection step, when a difference between the digital value and the extreme value is not greater than a second difference value, which is smaller than the first difference value, the digital value is not determined as the peak value even if the digital value exceeds the threshold.

Consequently, it becomes possible to prevent a noise from being erroneously detected when an output change of AD conversion is small.

Effect of the Invention

According to the present invention, the information reproduction apparatus and the information reproduction method enable the peak detection capability to be maintained even in a case where the gain is suddenly increased due to the automatic gain control (AGC) in a demagnetized card, for example, or when the vertical symmetry of the waveform is deteriorated due to a poor head touch in a curved card, for example, whereby the offset voltage is changed.

Figure 1:
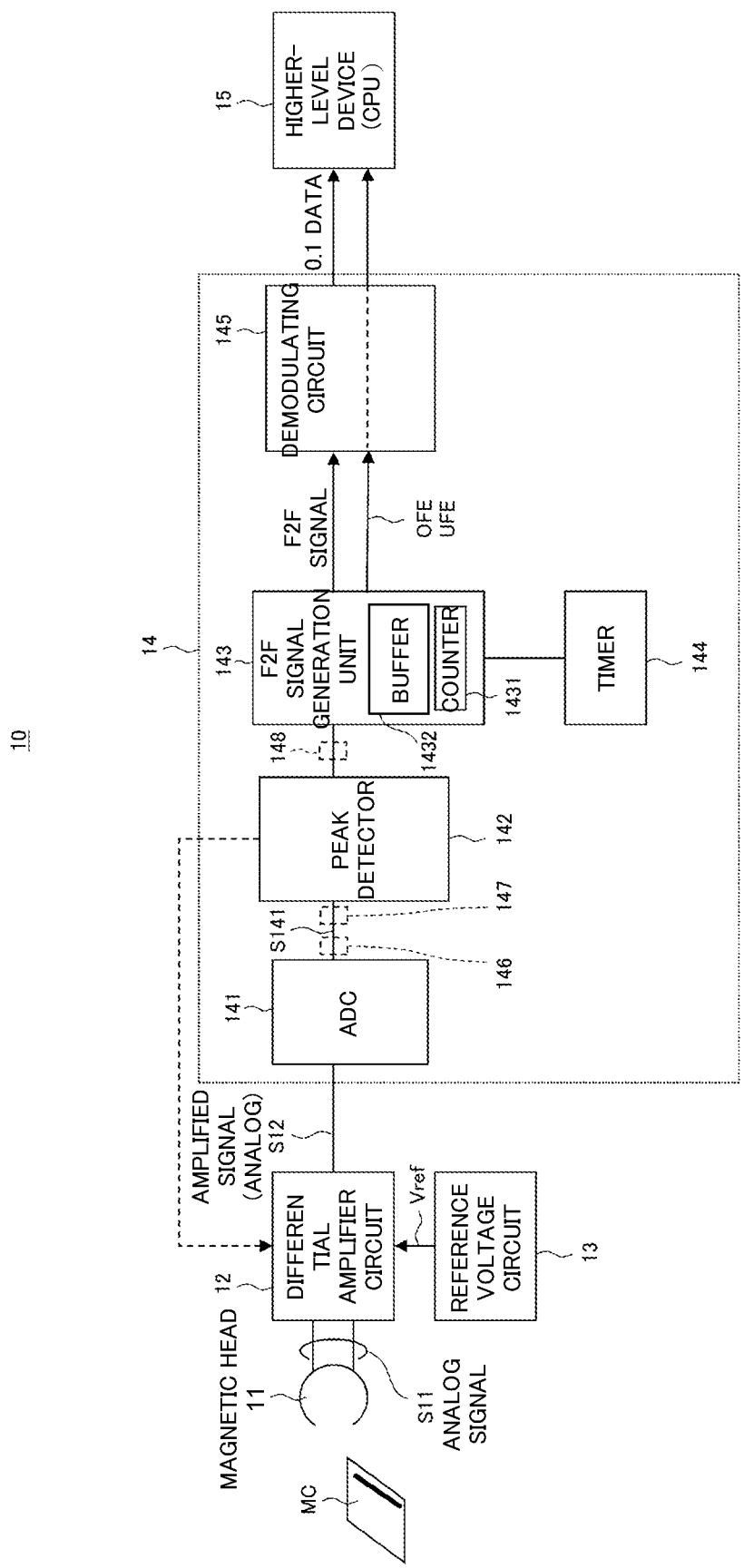
FIG. 1 is a block diagram showing a configuration example of an information reproduction apparatus according to a first embodiment of the present invention.
Figure 2:
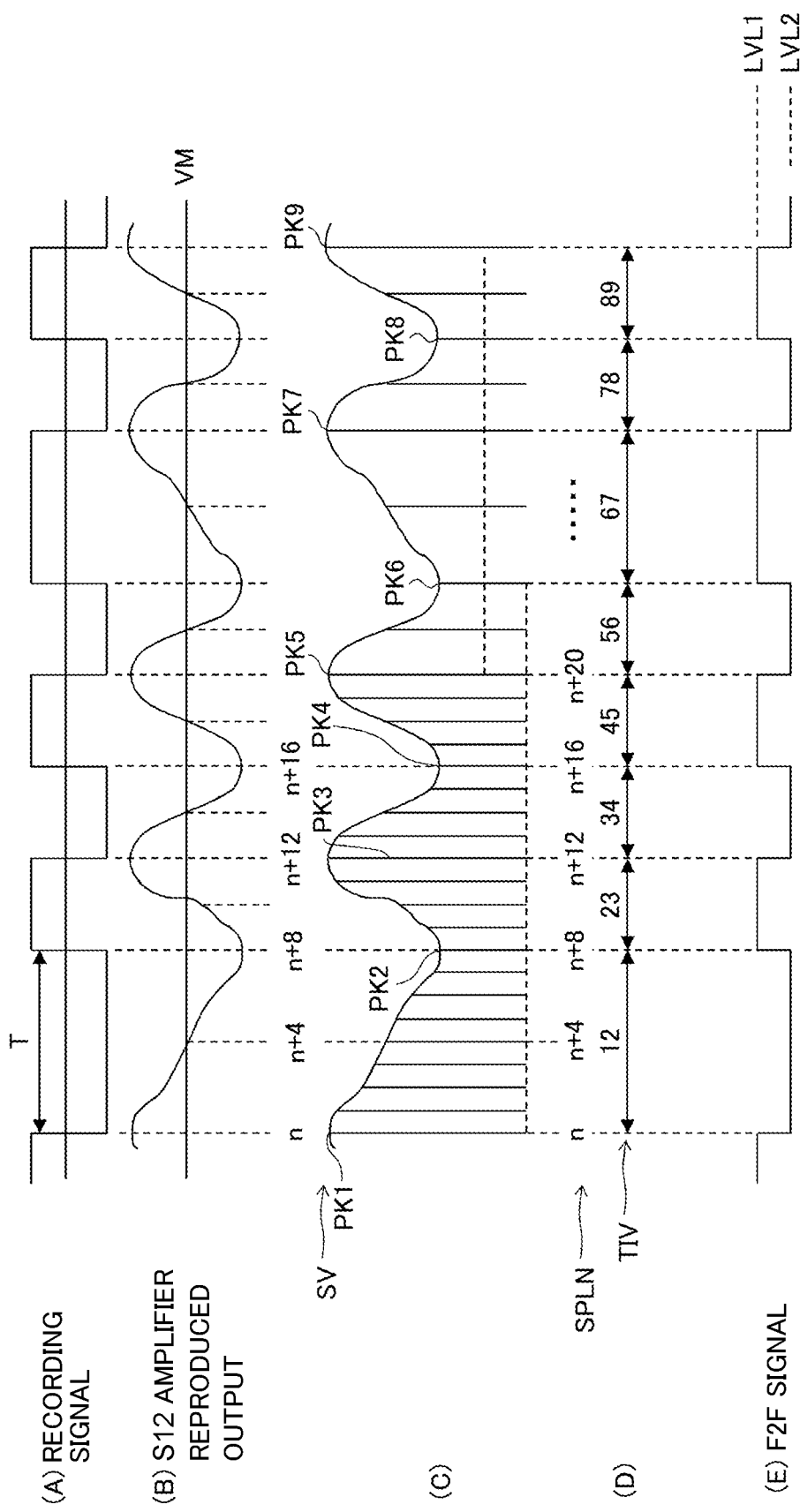

(A), (B), (C), (D) and (E) of FIG. 2 are diagrams showing signal processing waveforms of essential parts of the information reproduction apparatus of FIG. 1.

Figure 3A:
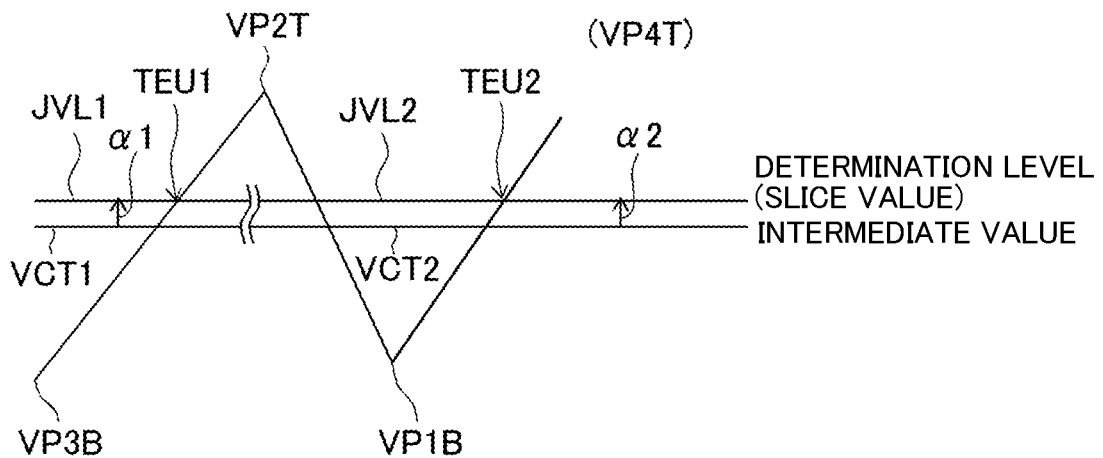

FIGS. 3(A) and (3B) are diagrams for explaining a peak detection method, according to the present embodiment, for determining whether or not a peak value is obtained based on whether or not two peak points have exceeded a threshold (i.e., a determination level).

Figure 4:
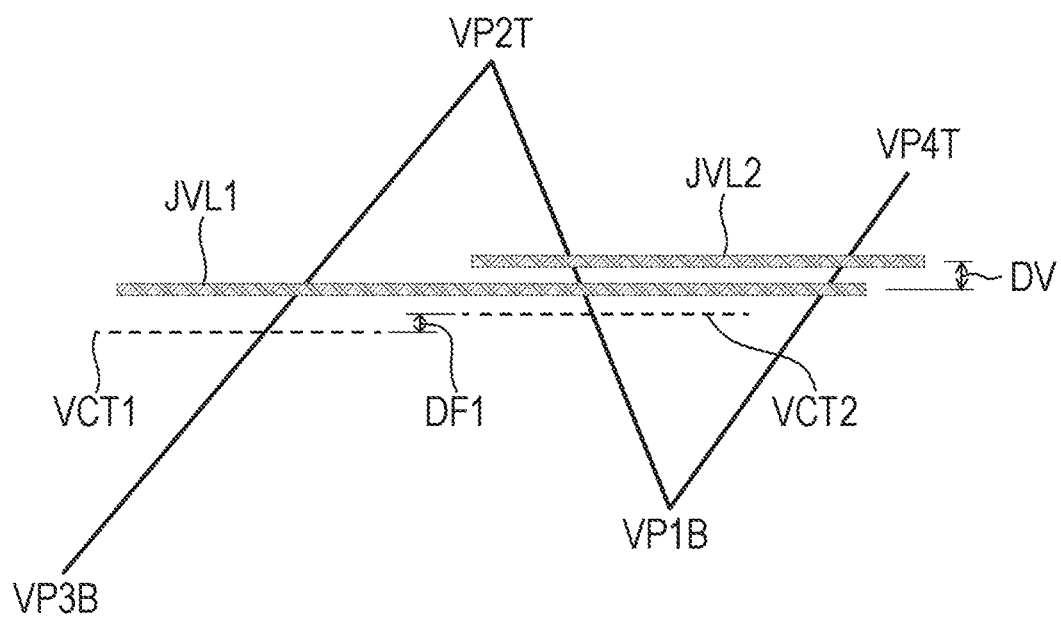

FIG. 4 is a diagram for explaining a first difference value to be set as a countermeasure against offset deviation according to the present embodiment.

Figure 5:
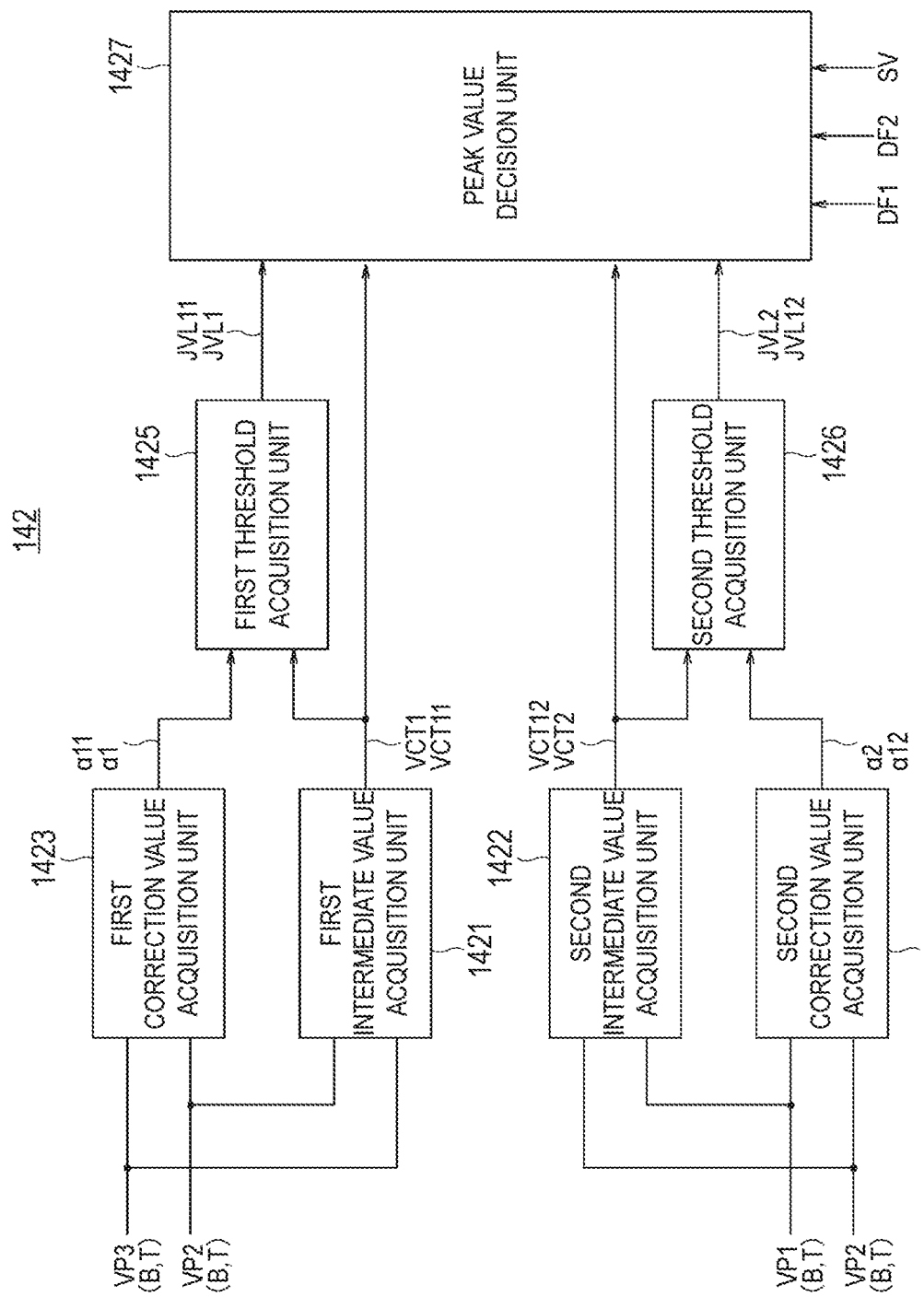

FIG. 5 is a block diagram showing a configuration example of a peak detector according to the present embodiment.

Figure 6:
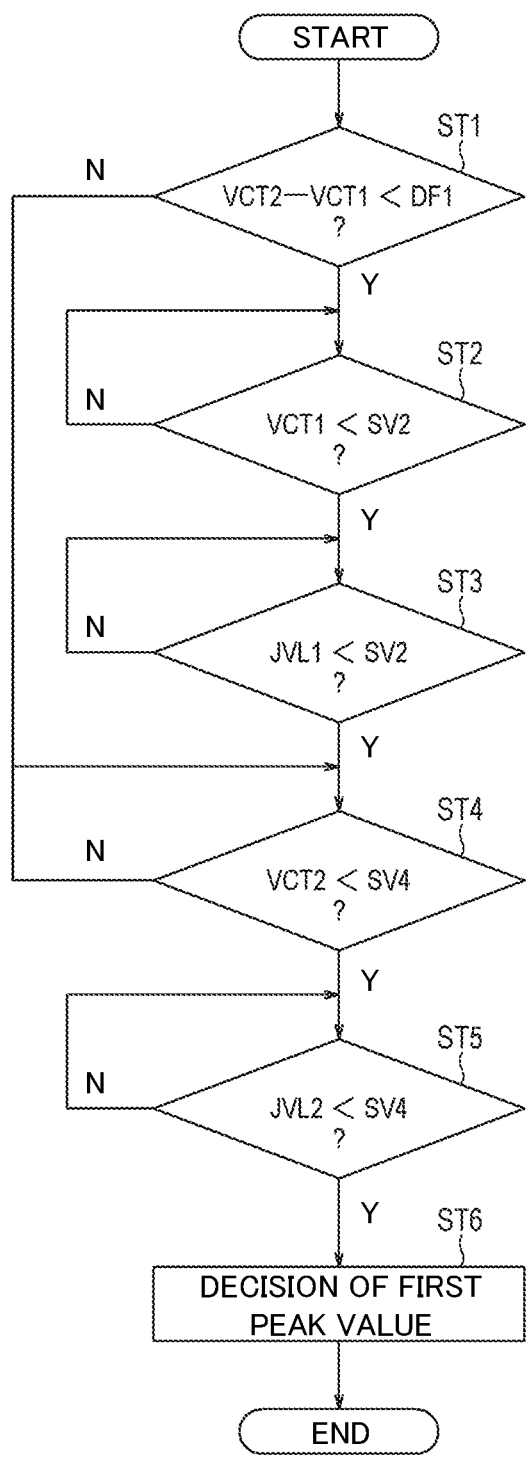

FIG. 6 is a flowchart for explaining a peak value decision process according to the first difference value of the present embodiment, and for is intended to explaining a process of a case where a first peak value to be determined corresponds to a peak value of the minimum value side (i.e., a valley side).

Figure 7:
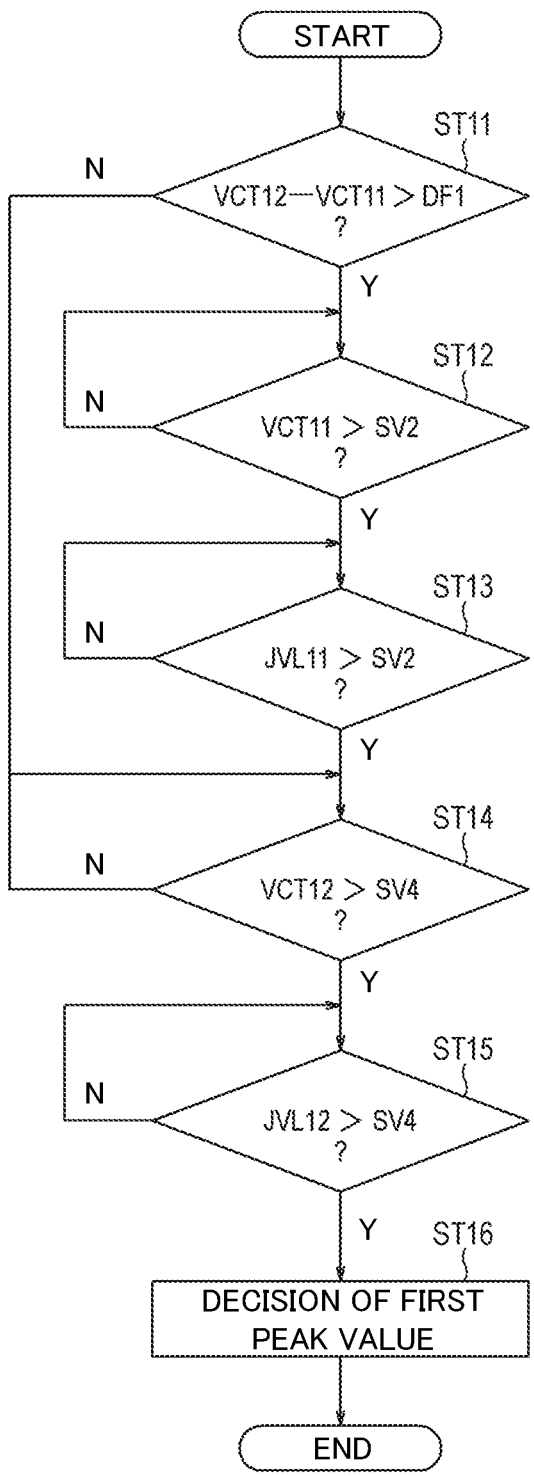

FIG. 7 is a flowchart for explaining a peak value decision process according to the first difference value of the present embodiment, and for explaining a process of a case where the first peak value to be determined corresponds to a peak value of the maximum value side (i.e., a mountain side).

Figure 8:
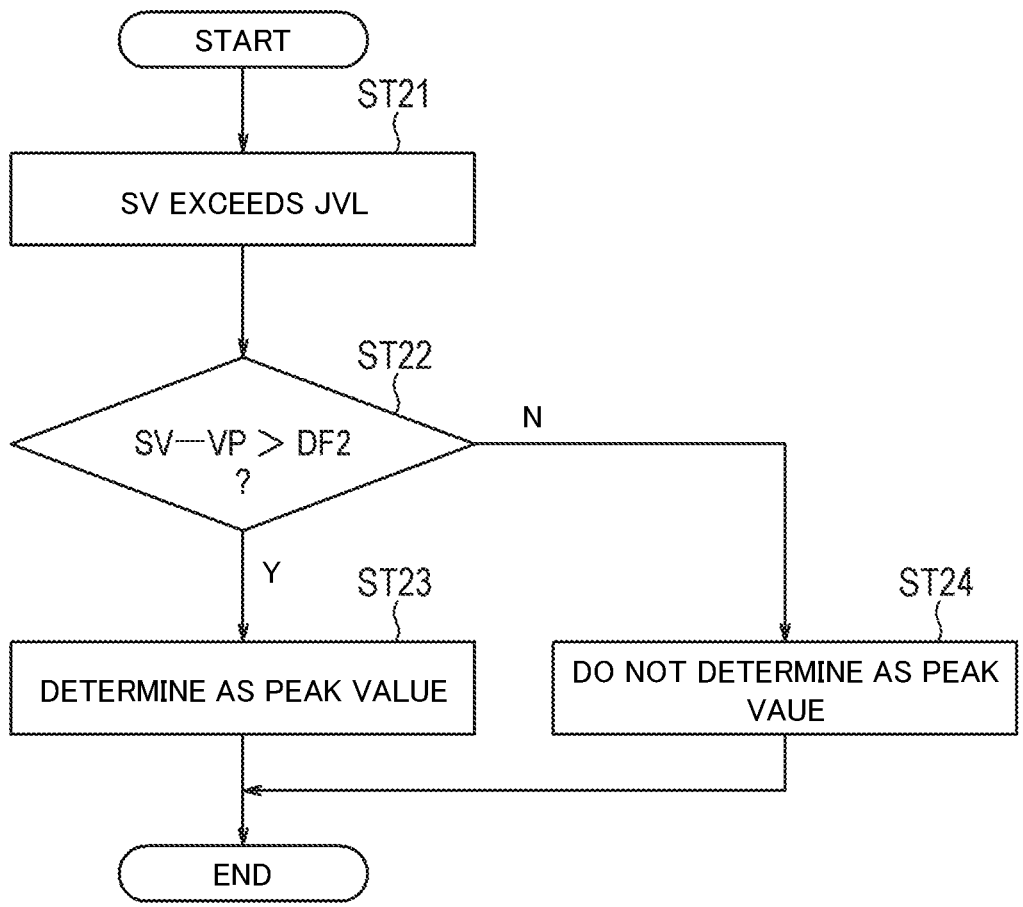

FIG. 8 is a flowchart for explaining a determination process according to a second difference value of the present embodiment.

Figure 9:
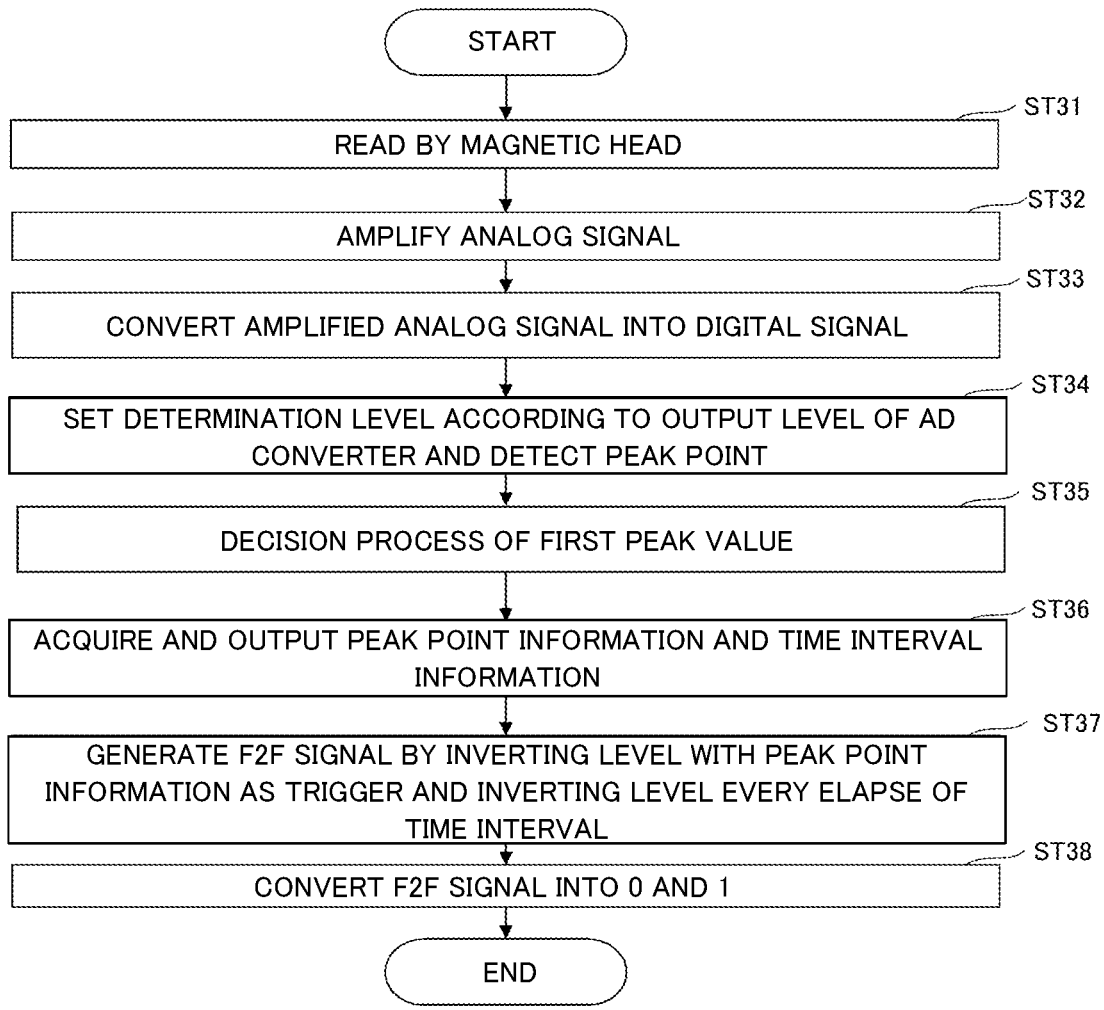

FIG. 9 is a flowchart for explaining an overall operation outline of the information reproduction apparatus according to the present embodiment.

Figure 10:
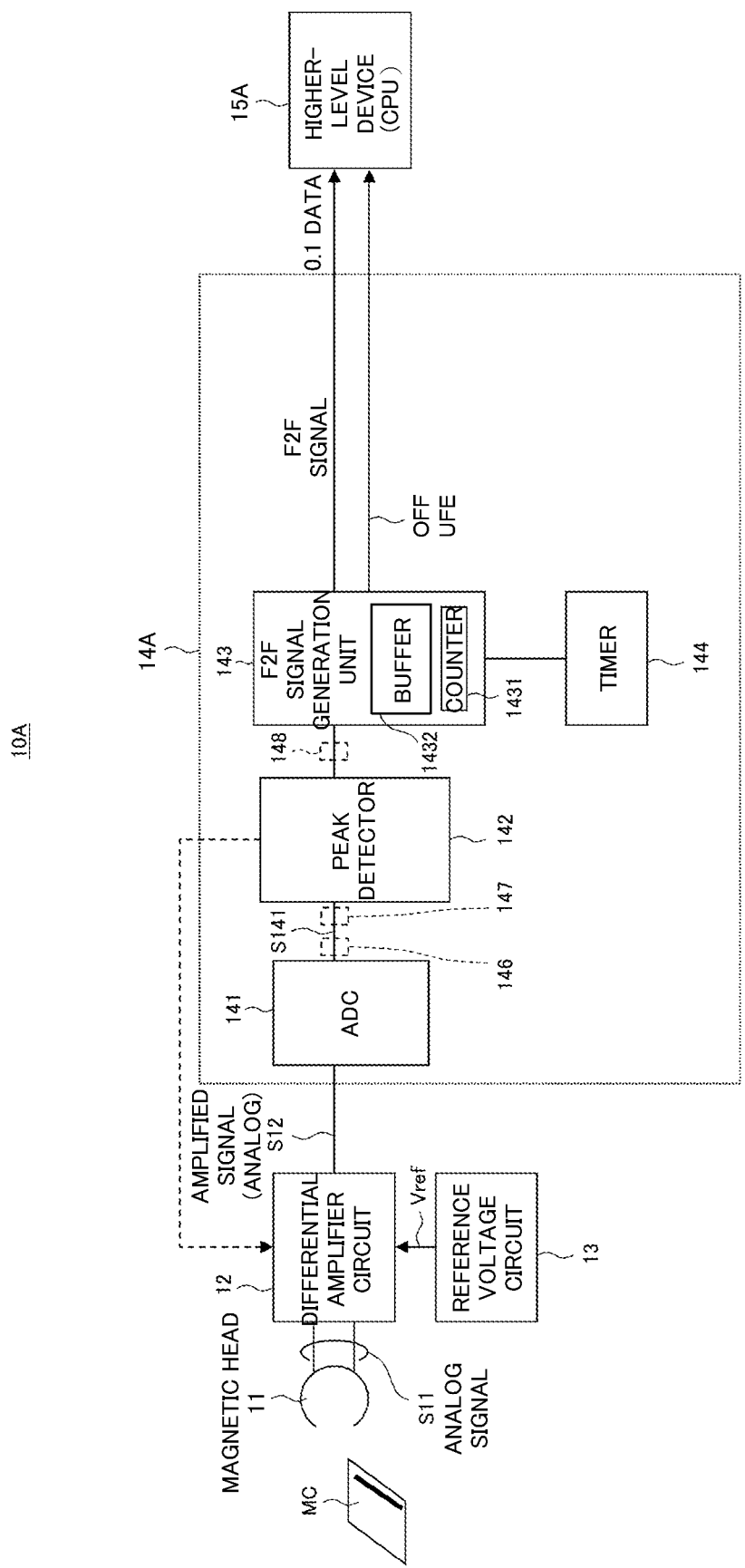

FIG. 10 is a block diagram showing a configuration example of an information reproduction apparatus according to a second embodiment of the present invention.

MODE FOR CARRYING OUT THE INVENTION

Hereinafter, embodiments of the present invention will be described with reference to the drawings.

First Embodiment

FIG. 1 is a block diagram showing a configuration example of an information reproduction apparatus according to a first embodiment of the present invention. (A) of FIG. 2 to (E) of FIG. 2 are diagrams showing signal processing waveforms of essential parts of the information reproduction apparatus of FIG. 1.

(Configuration of Card Reader)

In the present embodiment, as an information reproduction apparatus, a card reader, which reproduces information recorded on a magnetic card, etc., which is a recording medium, (hereinafter referred to as a "card reader") will be described as an example. Further, in the present embodiment, a case of reading and reproducing F and 2F signals for "0" and "1" signals that have been magnetically recorded by the frequency modulation method will be described as an example. However, the present technique is not limited to an F2F method, but various methods such as an F3F method, an NRZI method, and an MFM method can be applied.

As shown in FIG. 1, a card reader 10 includes a magnetic head 11, a differential amplifier circuit 12, a reference voltage circuit 13, a digital reproduction processing circuit 14, and a higher-level device (CPU) 15. The digital reproduction processing circuit 14 in the present first embodiment comprises an analog-to-digital converter (AD converter: ADC) 141, a peak detector 142, an F2F signal generation unit 143 as an information generation unit, a timer 144, and a demodulating circuit 145.

The magnetic head 11 reads magnetically recorded information, which is information recorded on a magnetic card MC (hereinafter referred to as a "card MC"), which is a magnetic recording medium, by the F2F modulation method, as shown in (A) of FIG. 2, for example, as an analog signal.

The differential amplifier circuit 12 is constituted by an operational amplifier, and amplifies an analog signal S11, which has been read and reproduced by the magnetic head 11, to an appropriate level. Then, an amplified analog signal S12, as shown in (B) of FIG. 2, is output to the AD converter 141 of the digital reproduction processing circuit 14. Also, for the differential amplifier circuit 12, an intermediate value VM of the output analog signal S12 is set based on a reference voltage Vref supplied from the reference voltage circuit 13.

The differential amplifier circuit 12 has an automatic gain control (AGC) function. For example, as indicated by a broken line in FIG. 1, a gain of the differential amplifier circuit 12 is controlled in accordance with peak detection information in the peak detector 142 of the digital reproduction processing circuit 14. In the present embodiment, the differential amplifier circuit 12 differentially amplifies the analog signal S11 reproduced by the magnetic head 11 to a level corresponding to the peak detection information in the peak detector 142 of the digital reproduction processing circuit 14. The differential amplifier circuit 12 performs gain control so that the amplitude of the signal is set to, for example, a quarter (¼) of a full range.

The reference voltage circuit 13 supplies the reference voltage Vref set as the intermediate value VM of the output level to the differential amplifier circuit 12.

The AD converter 141 samples the analog signal S12 amplified by the differential amplifier circuit 12 and converts the analog signal S12 into a digital signal, and outputs the digital signal to the peak detector 142 as a signal S141 together with position information in a digital value corresponding to an elapse of the time. The AD converter 141 samples the analog signal S12 amplified by the differential amplifier circuit 12 at a predetermined frequency, for example, 300 kHz, and converts the analog signal S12 into a digital signal, and outputs the digital signal to the peak detector 142 as the signal S141 together with the position information in the digital value corresponding to the elapse of the time. In other words, by sampling the analog signal reproduced by the magnetic head 11, the AD converter 141 converts the analog signal into a digital signal at predetermined time intervals.

The AD converter 141 performs a sampling process at each sampling point (timing) indicated by sampling numbers SPLN represented as (n), . . . , (n+4), . . . , as shown in (C) of FIG. 2. This sampling number SPLN is used as the position information in the peak detector 142 at the next stage. The position information includes time information. Then, the AD converter 141 outputs the signal S141 including the position information formed by the sampling number SPLN, and values SV(n), . . . , (n+4), . . . of the respective sampling points, for example, to the peak detector 142.

Upon receipt of the digital signal S141 output from the AD converter 141, the peak detector 142 detects peak points corresponding to positions of extreme values (i.e., a local maximal value and a local minimal value) of magnetic data. More specifically, the peak detector 142 receives a digital value of the digital signal S141 of the AD converter 141, and detects a peak point corresponding to an extreme value position of the reproduced signal in accordance with whether the digital value to be input exceeds a threshold corresponding to a determination level made to conform to an output of the AD converter 141 from the digital signal.

The peak detector 142 acquires information on a peak point time interval (interval) TIV obtained from a plurality of items of peak point information, and outputs the information including the peak point information and the time interval TIV information to the F2F signal generation unit 143 as a signal S142. Information on the time interval TIV as the interval information corresponds to time interval information.

As described above, the peak detector 142 automatically sets a detection threshold (determination level) of a waveform at the time of peak detection in accordance with the output level of the AD converter 141. By this function, it is also possible to adapt to a card MC with varied output without switching the circuit. In the peak detector 142, with respect to a card MC with a large amount of noises, a method of determining that a peak point is obtained when two peak points have exceeded a certain threshold (determination level) is adopted.

In the peak detector 142 of the present embodiment, a peak detection method as described below can be adopted.

Figure 3B:
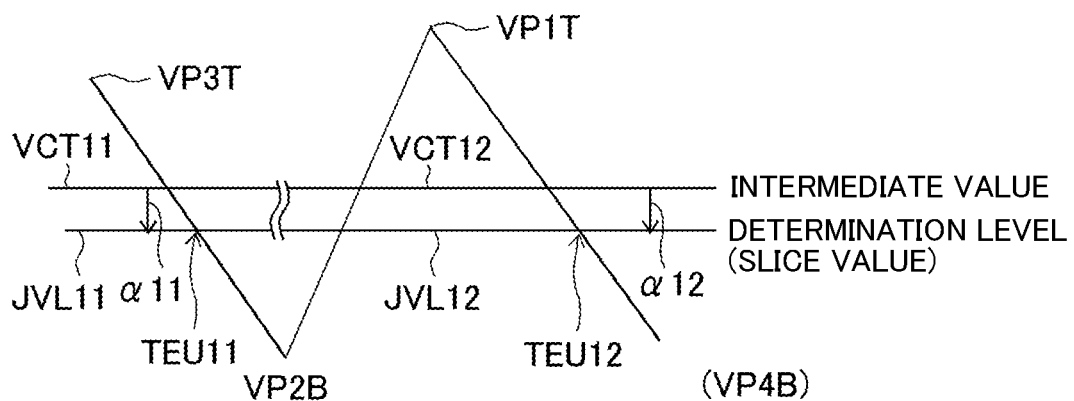

FIGS. 3(A) and 3(B) are diagrams for explaining the peak detection method for determining whether or not a peak value is obtained based on whether or not two peak points have exceeded the threshold (the determination level) in the peak detector of the present embodiment. FIG. 3(A) is a diagram for explaining the peak detection method of a case where the first peak value to be determined corresponds to a peak value of the minimum value side (the valley side), and FIG. 3(B) is a view for explaining the peak detection method of a case where the first peak value to be determined corresponds to a peak value of the maximum value side (the mountain side). Note that in FIGS. 3A and 3B, in order to facilitate understanding, the signal waveform is depicted as a triangular waveform.

In the peak detector 142, as shown in FIGS. 3(A) and 3(B), a second peak value VP2 (B, T) immediately before the first peak value VP1 (B, T) to be determined, a third peak value VP3 (B, T), which is the second preceding peak value with respect to the first peak value VP1 (B, T) to be determined, and also the next peak value (fourth peak value) VP4 (B, T) are applied to the first peak value VP1 (B, T) to be determined. Then, the peak detector 142 obtains each of first intermediate values VCT1 and VCT11 between the third peak value VP3 (B, T) and the second peak value VP2 (B, T), and further obtains each of second intermediate values VCT2 and VCT12 between the first peak value VP1 (B, T) and the second peak value VP2 (B, T). The peak detector 142 obtains first correction values α1 and α11 each obtained by multiplying a difference between the third peak value VP3 (B, T) and the second peak value VP2 (B, T) by a predetermined ratio based on the difference. Further, by adding the first correction values α1 and α11 to the first intermediate values VCT1 and VCT11, respectively, the peak detector 142 obtains first thresholds JVL1 and JVL11. The peak detector 142 obtains second correction values α2 and α12 each obtained by multiplying a difference between the second peak value VP2 and the first peak value VP1 by a predetermined ratio based on the difference. Further, by adding the second correction values α2 and α12 to the second intermediate values VCT2 and VCT12, respectively, the peak detector 142 obtains second thresholds JVL2 and JVL12. Further, the peak detector 142 confirms that a digital value corresponding to the second peak value VP2 (B, T) has exceeded the first intermediate values VCT1 and VCT11, and also the first thresholds JVL1 and JVL11, and that a digital value corresponding to the next peak value VP4 (B, T) has exceeded the second intermediate values VCT2 and VCT12, and also the second thresholds JVL2 and JVL12, and then decides the first peak value VP1 (B, T).

As shown in FIG. 3(A), in a case where the first peak value to be determined corresponds to the peak value of the minimum value side (the valley side), in order to prevent a small noise from being determined as a peak, the peak detector 142 requires the value not only to exceed the threshold (a slice value), but also to be greater than the minimum-value-side first peak value (valley side) VP1 by a certain value or more, as the condition of the peak value determination. As shown in FIG. 3(B), in a case where the first peak value to be determined corresponds to the peak value of the maximum value side (the mountain side), in order to prevent a small noise from being determined as a peak, the peak detector 142 requires the value to exceed the threshold (the slice value), and also to be smaller than the maximum-value-side first peak value (mountain side) VP1 by a certain value or more, as the condition of the peak value determination.

By adopting the above-described peak point detection method, the card reader 10 can reproduce information by reliable handling also for a card MC with a large amount of noises.

[Basic Peak Detection Method of Peak Detector 142]

Here, a specific process example of peak detection in the peak detector 142 will be described. The peak detector 142 first determines the magnetic data converted into digital data by the AD converter 141 based on an initial threshold (determination level) JVL, and determines that a peak is obtained when the digital value exceeds the determination level JVL.

By the peak detector 142, the next determination level JVL is obtained from the previous peak value. Specifically, a value (correction value, level) α, which is obtained by multiplying a value derived from subtracting a valley digital value (Min) from a mountain digital value (Max) of the waveform, i.e., PtoP=Max−Min, by a certain ratio based on the aforementioned difference, is obtained, and a value (level), which is obtained by adding (or subtracting) the correction value α to the intermediate value VCT between the digital value (Max) and the digital value (Min), is assumed as the determination level JVL.

Determination Level $JVL = VCT \pm PtoP * C = VCT \pm \alpha$     [Mathematical Expression 1]

In the above, C represents a constant, and is, for example, set to $C = 1/2^n$, for example, $1/2^5 = 1/32$.

The determination level is automatically set by the above computational expression. Consequently, it is possible to detect both the card MC of low output (also referred to as a demagnetized card) and the card MC of high output. More specifically, the peak detector 142 automatically sets the determination level (detection threshold) of the waveform at the time of peak detection in accordance with the output level of the AD converter 141. By the above feature, it is possible to adapt to a card MC with varied output without switching the circuit.

[More Accurate Peak Detection Method of Peak Detector 142]

In the present embodiment, the peak detector 142 determines whether a peak value is obtained by confirming that not only one peak point, but also two peak points have exceeded the determination level (threshold) with respect to a card MC with a large amount of noises. Here, the peak detector 142 automatically sets the determination level (the detection threshold or the slice value) JVL of the waveform at the time of peak detection, and the intermediate value VCT, which is a difference between the peak values, in accordance with the output level of the AD converter 141.

In determining a peak value, the peak detector 142 performs arithmetic processing by applying the second peak value VP2 immediately before the first peak value VP1 to be determined, the third peak value VP3, which is the second preceding peak value with respect to the first peak value VP1 to be determined, and also the next peak value (fourth peak value) VP4 (B, T) to the first peak value VP1 (B, T) to be determined. Accordingly, the peak detector 142 has the function of holding a necessary digital value to be input, and the determined peak value in a holding part such as a register or a memory not shown.

The peak detector 142 obtains the first correction values α1 and α11, which are each obtained by multiplying a difference (VP3−VP2) between the third peak value VP3 and the second peak value VP2 by a predetermined ratio C (=1/2n) based on the difference (the absolute value of the difference). In parallel with the above, the peak detector 142 obtains and sets the first intermediate values VCT1 and VCT11 between the second peak value VP2 and the third peak value VP3. Then, the peak detector 142 obtains first determination levels (thresholds) JVL1 and JVL11 by adding the first correction values α1 and α11 to the first intermediate values VCT1 and VCT11 between the third peak value VP3 and the second peak value VP2, respectively, more specifically, by performing addition at the maximum value side and subtraction at the minimum value side, and sets the first determination levels (thresholds) JVL1 and JVL11. Further, the peak detector 142 obtains the second correction values α2 and β12, which are each obtained by multiplying a difference (VP2−VP1) between the second peak value VP2 and the first peak value VP1 by a predetermined ratio C (=1/2n) based on the difference, and sets the second correction values α2 and α12. In parallel with the above, the peak detector 142 obtains and sets the second intermediate values VCT2 and VCT12 between the second peak value VP2 and the first peak value VP1. Then, the peak detector 142 obtains second determination levels (thresholds) JVL2 and JVL12 by adding the second correction values α2 and α12 to the second intermediate values VCT2 and VCT12 between the second peak value VP2 and the first peak value VP1, respectively, more specifically, by performing addition at the maximum value side and subtraction at the minimum value side, and sets the second determination levels (thresholds) JVL2 and JVL12. Then, the peak detector 142 confirms that a value of the digital signal has exceeded the first intermediate values VCT1 and VCT11, and the set first determination levels (thresholds) JVL1 and JVL11, and also exceeded the second intermediate values VCT2 and VCT12 and the set second determination levels (thresholds) JVL2 and JVL12.

The peak detector 142 confirms that a digital value corresponding to the second peak value VP2 has exceeded the first intermediate values VCT1 and VCT11, and also the first thresholds JVL1 and JVL11, and that a digital value corresponding to the next peak value VP4 has exceeded the second intermediate values VCT2 and VCT12, and also the second thresholds JVL2 and JVL12, and then decides the first peak value VP1.

In a reproduced signal, as the peak values, the maximum-(local maximal)-value-side (mountain-side) peak value and the minimum-(local minimal)-side (valley-side) peak value exist alternately with an intermediate point interposed therebetween. In the peak detection of signals as described above, in the peak detector 142, setting positions of the determination levels JVL1, JVL2, JVL11, and JVL12 are different with respect to the intermediate values VCT1, VCT2, VCT11, and VCT12, in cases where the first peak value to be determined corresponds to the peak value of the minimum value side (valley side) and where the same corresponds to the maximum value side (mountain side). In a case where the first peak value to be determined corresponds to the minimum-value-side peak value (valley side), the peak detector 142 sets the first and second determination levels (thresholds) JVL1 and JVL2 to be at the maximum value side relative to the first and second intermediate values VCT1 and VCT2. More specifically, in a case where the first peak value to be determined corresponds to the minimum-value-side peak value (valley side), the peak detector 142 adds the first correction value α1 to the first intermediate value VCT1, adds the second correction value α2 to the second intermediate value VCT2, and sets the first and second determination levels (thresholds) JVL1 and JVL2 to be at the maximum value side relative to the first and second intermediate values VCT1 and VCT2. In a case where the first peak value to be determined corresponds to the maximum-value-side peak value (mountain side), the peak detector 142 sets the first and second determination levels (thresholds) JVL11 and JVL12 to be at the minimum value side relative to the first and second intermediate values VCT11 and VCT12. More specifically, in a case where the first peak value to be determined corresponds to the maximum-value-side peak value (mountain side), the peak detector 142 subtracts the first correction value α11 from the first intermediate value VCT11, subtracts the second correction value α12 from the second intermediate value VCT12, and sets the first and second determination levels (thresholds) JVL11 and JVL12 to be at the minimum value side relative to the first and second intermediate values VCT11 and VCT12.

When peak detection is performed by a peak detection method as described above, in a demagnetized card MC, for example, when a gain is suddenly increased due to automatic gain control (AGC) of the amplifier (differential amplifier circuit 12), the gain is also applied to the offset voltage of the amplifier. Thus, the offset voltage is increased. Also, in a case where vertical symmetry of the waveform is deteriorated when a head touch is poor as in a curved card MC having a curve, the offset voltage is changed. In the above case, when a peak is to be detected with two stages of thresholds JVL1 and JVL2 (JVL11 and JVL12), since the offset voltage is changed, a deviation between the first-stage threshold JVL1 (JVL11) and the second-stage threshold JVL2 (JVL12) becomes large, and there is a possibility of not being able to perform the peak detection.

The peak detector 142 has the processing function as described below so that the peak detection capability can be maintained even in a case where the offset voltage is changed.

When differences (VCT2−VCT1) (VCT12−VCT11) between the first intermediate values VCT1 and VCT11 and the second intermediate values VCT2 and VCT12 are each greater than or equal to a first difference value DF1, the peak detector 142 ignores the first thresholds JVL1 and JVL11, and decides the first peak value VP1 (B, T) after confirming that a digital value SV4 corresponding to the next peak value VP4 (B, T) has exceeded the second thresholds JVL2 and JVL12.

When the differences (VCT2−VCT1) (VCT12−VCT11) between the first intermediate values VCT1 and VCT11 and the second intermediate values VCT2 and VCT 12 are each within the first difference value DF1, the peak detector 142 decides the first peak value VP1 (B, T) after confirming that a digital value SV2 corresponding to the second peak value VP2 (B, T) has exceeded the first intermediate values VCT1 and VCT11, and also the first thresholds JVL1 and JVL11, and that the digital value SV4 corresponding to the next peak value VP4 (B, T) has exceeded the second intermediate values VCT2 and VCT12, and also the second thresholds JVL2 and JVL12.

Note that when a difference between the digital value and the extreme value is not greater than a second difference value DF2, which is smaller than the first difference value DF1, the peak detector 142 is configured not to determine the digital value as the peak value even if the digital value exceeds the threshold.

FIG. 4 is a diagram for explaining the first difference value to be set as a countermeasure against offset deviation according to the present embodiment.

With the peak detection method of the present embodiment, as described above, two stages of the thresholds JVL1 and JVL2 (JVL11 and JVL12) are set. If a deviation between the first intermediate value VCT1 and the second intermediate value VCT2, which is a computational reference voltage in the first stage and the second stage, is greater than or equal to a certain value (for example, 60 mV or more), there is a possibility of not being able to perform peak detection as will be explained below. Therefore, the first threshold JVL1 in the first stage is ignored. As described above, in a demagnetized card MC, for example, when a gain is suddenly increased due to automatic gain control (AGC) of the amplifier (differential amplifier circuit 12), the gain is also applied to the offset voltage of the amplifier. Thus, the offset voltage is increased. Also, in a case where vertical symmetry of the waveform is deteriorated when a head touch is poor as in a curved card MC, the offset voltage is changed. In such a case, when a peak is to be detected with two stages of the thresholds JVL1 and JVL2, since the offset voltage is changed, a deviation DV between the first-stage threshold JVL1 and the second-stage threshold JVL2 becomes large. Thus, there is a possibility of not being able to perform the peak detection. Therefore, in the present embodiment, when a deviation between the first intermediate value VCT1 and the second intermediate value VCT2 is greater than or equal to a certain value (for example, 60 mV or more), the first threshold JVL1 in the first stage is ignored.

In the present embodiment, an acceptable value limit of the deviation between the first intermediate value VCT1 and the second intermediate value VCT2 is set as the first difference value DF1. More specifically, the first difference value DF1 occurs since gain switching is based on the automatic gain control (AGC), and an update of the AGC is carried out after every peak detection. That is, since a gain is applied also to a DC level in the next peak detection after the gain update, a deviation from the previous intermediate value occurs. The first difference value DF1 indicates the acceptable value limit of the deviation.

Also, the second difference value DF2 indicates an allowable limit value for preventing a noise from being erroneously detected when an output change of the AD conversion is small, and is set to 8 mV, for example.

Since the peak detector 142 includes the above function, it becomes possible to maintain the peak detection capability even in a case where the gain is suddenly increased due to the AGC in a demagnetized card MC, for example, or when the vertical symmetry of the waveform is deteriorated due to a poor head touch in a curved card MC, for example, whereby the offset voltage is changed.

FIG. 5 is a block diagram showing a configuration example of the peak detector according to the present embodiment.

The peak detector 142 in FIG. 5 includes a first intermediate value acquisition unit 1421, a second intermediate value acquisition unit 1422, a first correction value acquisition unit 1423, a second correction value acquisition unit 1424, a first threshold acquisition unit 1425, a second threshold acquisition unit 1426, and a peak value decision unit 1427.

The first intermediate value acquisition unit 1421 obtains the first intermediate values VCT1 and VCT11 between the third peak value VP3 (B, T) and the second peak value VP2 (B, T). The first intermediate value acquisition unit 1421 outputs the acquired first intermediate values VCT1 and VCT11 to the first threshold acquisition unit 1425 and the peak value decision unit 1427.

The second intermediate value acquisition unit 1422 obtains the second intermediate values VCT2 and VCT12 between the second peak value VP2 (B, T) and the first peak value VP1 (B, T). The second intermediate value acquisition unit 1422 outputs the acquired second intermediate values VCT2 and VCT12 to the second threshold acquisition unit 1426 and the peak value decision unit 1427.

The first correction value acquisition unit 1423 obtains the first correction values α1 and α11, which are each obtained by multiplying a difference (VP3−VP2) between the third peak value VP3 (B, T) and the second peak value VP2 (B, T) by a predetermined ratio C (=1/2$^n$) based on the difference. The first correction value acquisition unit 1423 outputs the acquired first correction values α1 and α11 to the first threshold acquisition unit 1425.

The second correction value acquisition unit 1424 obtains the second correction values α2 and α12, which are each obtained by multiplying a difference (VP2−VP1) between the second peak value VP2 (B, T) and the first peak value VP1 (B, T) by a predetermined ratio C (=1/2$^n$) based on the difference. The second correction value acquisition unit 1424 outputs the acquired second correction values α2 and α12 to the second threshold acquisition unit 1426.

The first threshold acquisition unit 1425 obtains the first thresholds JVL1 and JVL11 by adding the first correction values α1 and α11 to the first intermediate values VCT1 and VCT11, respectively. The first threshold acquisition unit 1425 outputs the acquired first thresholds JVL1 and JVL11 to the peak value decision unit 1427.

The second threshold acquisition unit 1426 obtains the second thresholds JVL2 and JVL12 by adding the second correction values α2 and α12 to the second intermediate values VCT2 and VCT12, respectively. The second threshold acquisition unit 1426 outputs the acquired second thresholds JVL2 and JVL12 to the peak value decision unit 1427.

When differences (VCT2−VCT1) (VCT12−VCT11) between the first intermediate values VCT1 and VCT11 and the second intermediate values VCT2 and VCT 12 are each within the first difference value DF1, the peak value decision unit 1427 decides the first peak value VP1 after confirming that the digital value SV2 corresponding to the second peak value VP2 has exceeded the first intermediate values VCT1 and VCT11, and also the first thresholds JVL1 and JVL11, and that the digital value SV4 corresponding to the next peak value VP4 has exceeded the second intermediate values VCT2 and VCT12, and also the second thresholds JVL2 and JVL12.

When the differences (VCT2−VCT1) (VCT12−VCT11) between the first intermediate values VCT1 and VCT11 and the second intermediate values VCT2 and VCT 12 are each greater than or equal to the first difference value DF1, the peak value decision unit 1427 ignores the first threshold, and decides the first peak value VP1 after confirming that the digital value SV4 corresponding to the next peak value VP4 has exceeded the second intermediate values VCT2 and VCT12, and also the second thresholds JVL2 and JVL12.

FIGS. 6 and 7 are flowcharts for explaining a peak value decision process according to the first difference value of the present embodiment. FIG. 6 is a view for explaining the process of a case where the first peak value to be determined corresponds to the minimum-value-side peak value (valley side), and FIG. 7 is a view for explaining the process of a case where the first peak value to be determined corresponds to the maximum-value-side peak value (mountain side).

(Case where First Peak Value to be Determined Corresponds to Minimum-Value-Side Peak Value [Valley Side])

As shown in FIG. 6, the peak value decision unit 1427 determines whether or not a difference (VCT2−VCT1) between the first intermediate value VCT1 and the second intermediate value VCT2 is within the first difference value DF1 (ST1). When it is determined in step ST1 that the difference (VCT2−VCT1) between the first intermediate value VCT1 and the second intermediate value VCT2 is within the first difference value DF1, in step ST2, whether or not the digital value SV2 corresponding to the second peak value VP2T has exceeded the first intermediate value VCT1 (i.e., whether or not the digital value SV2 is greater than the first intermediate value VCT1) is determined. When it is determined in step ST2 that the digital value SV2 exceeded the first intermediate value VCT1, next, in step ST3, whether or not the digital value SV2 corresponding to the second peak value VP2T has exceeded the first threshold JVL1 (i.e., whether or not the digital value SV2 is greater than the first threshold JVL1) is determined. When it is determined in step ST3 that the digital value SV2 exceeded the first threshold JVL1, next, in step ST4, whether or not the digital value SV4 corresponding to the fourth peak value VP4T has exceeded the second intermediate value VCT2 (i.e., whether or not the digital value SV4 is greater than the second intermediate value VCT2) is determined. When it is determined in step ST4 that the digital value SV4 exceeded the second intermediate value VCT2, next, in step ST5, whether or not the digital value SV4 corresponding to the fourth peak value VP4T has exceeded the second threshold JVL2 (i.e., whether or not the digital value SV4 is greater than the second threshold JVL2) is determined. When it is determined in step ST5 that the digital value SV4 exceeded the second threshold JVL2, in step ST6, the first peak value VP1B is decided after confirming the above point.

In step ST1, when it is determined that the difference (VCT2−VCT1) between the first intermediate value VCT1 and the second intermediate value VCT2 is not within the first difference value DF1, the processing in step ST2 and step ST3 is skipped, and the processing of the above steps ST4 to ST6 is carried out.

(Case where First Peak Value to be Determined Corresponds to Maximum-Value-Side Peak Value [Mountain Side])

As shown in FIG. 7, the peak value decision unit 1427 determines whether or not a difference (VCT12−VCT11) between the first intermediate value VCT11 and the second intermediate value VCT12 is within the first difference value DF1 (ST11). When it is determined in step ST11 that the difference (VCT12−VCT11) between the first intermediate value VCT11 and the second intermediate value VCT12 is within the first difference value DF1, in step ST12, whether or not the digital value SV2 corresponding to the second peak value VP2B has exceeded the first intermediate value VCT11 (i.e., whether or not the digital value SV2 is smaller than the first intermediate value VCT11) is determined. When it is determined in step ST12 that the digital value SV2 exceeded the first intermediate value VCT11, next, in step ST13, whether or not the digital value SV2 corresponding to the second peak value VP2B has exceeded the first threshold JVL11 (i.e., whether or not the digital value SV2 is smaller than the first threshold JVL11) is determined. When it is determined in step ST13 that the digital value SV2 exceeded the first threshold JVL11, next, in step ST14, whether or not the digital value SV4 corresponding to the fourth peak value VP4B has exceeded the second intermediate value VCT12 (i.e., whether or not the digital value SV4 is smaller than the second intermediate value VCT12) is determined. When it is determined in step ST14 that the digital value SV4 exceeded the second intermediate value VCT12, next, in step ST15, whether or not the digital value SV4 corresponding to the fourth peak value VP4B has exceeded the second threshold JVL12 (i.e., whether or not the digital value SV4 is smaller than the second threshold JVL12) is determined. When it is determined in step ST15 that the digital value SV4 exceeded the second threshold JVL12, in step ST16, the first peak value VP1T is decided after confirming the above point.

In step ST11, when it is determined that the difference (VCT12−VCT11) between the first intermediate value VCT11 and the second intermediate value VCT12 is not within the first difference value DF1, the processing in step ST12 and step ST3 is skipped, and the processing of the above steps ST14 to ST16 is carried out.

By the above feature, it becomes possible to maintain the peak detection capability even in a case where the gain is suddenly increased due to the AGC in a demagnetized card MC, for example, or when the vertical symmetry of the waveform is deteriorated due to a poor head touch in a curved card MC, for example, whereby the offset voltage is changed.

Also, in the present embodiment, when the difference between the digital value SV and the extreme value VP is not greater than the second difference value DF2 smaller than the first difference value DF1, the peak value decision unit 1427 does not determine that a peak value is obtained even if the digital value SV exceeds the threshold JVL.

FIG. 8 is a flowchart for explaining a determination process according to the second difference value of the present embodiment.

In the peak value decision unit 1427, for example, when the digital value SV exceeds the threshold JVL (ST21), it is determined whether or not a difference between the digital value SV and the extreme value VP is greater than or equal to the second difference value DF2 (ST22). If it is determined in step ST21 that the difference between the digital value SV and the extreme value VP is greater than or equal to the second difference value DF2, the peak value decision unit 1427 determines that the digital value SV that has exceeded the threshold JVL is the peak value (ST23). If it is determined in step ST21 that the difference between the digital value SV and the extreme value VP is not greater than the second difference value DF2, the peak value decision unit 1427 determines that the digital value SV that has exceeded the threshold JVL is not the peak value (ST24).

Consequently, it becomes possible to prevent a noise from being erroneously detected when an output change of the AD conversion is small.

A more specific determination process of the peak value will be described with reference to FIGS. 3(A) and 3(B). The following explanation relates to steps ST2 to ST6 in FIG. 6, and steps ST12 to ST16 in FIG. 7.

[Peak Detection Method of Case where First Peak Value to be Determined Corresponds to Minimum-Value-Side Peak Value (Valley Side)]

First, a peak detection method of a case where the first peak value to be determined corresponds to the minimum-value-side peak value (valley side) will be explained with reference to FIG. 3(A).

When the first peak value VP1B to be determined corresponds to the minimum-value-side peak value, the peak detector 142 applies the maximum-value-side second peak value VP2T immediately before the first peak value VP1B, the minimum-value-side third peak value VP3B, which is the second preceding peak value with respect to the first peak value VP1B, and also the next peak value (the fourth peak value) VP4T to the first peak value VP1B to be determined. The peak detector 142 obtains the first correction value α1, which is obtained by multiplying a difference (VP3B−VP2T) between the third peak value VP3B and the second peak value VP2T by a ratio C1 (=1/2″) based on the difference. In parallel with the above, the peak detector 142 obtains and sets the first intermediate value VCT1 between the second peak value VP2T and the third peak value VP3B. Then, the peak detector 142 obtains the first determination level (threshold) JVL1 by adding the first correction value α1 to the first intermediate value VCT1 between the third peak value VP3B and the second peak value VP2T, and sets the first determination level (threshold) JVL1. The peak detector 142 sets the first determination level JVL1 to be at the maximum value side (mountain side) relative to the first intermediate value VCT1 between the second peak value VP2T and the third peak value VP3B. The peak detector 142 determines whether a value of the digital signal from the AD converter 141 exceeds the first intermediate value VCT1 and the first determination level JVL1 that have been set.

Further, the peak detector 142 obtains the second correction value α2, which is obtained by multiplying a difference (VP2T−VP1B) between the second peak value VP2T and the first peak value VP1B by a ratio C2 (=1/2″) based on the difference, and sets the second correction value α2. In parallel with the above, the peak detector 142 obtains and sets the second intermediate value VCT2 between the second peak value VP2T and the first peak value VP1B. Then, the peak detector 142 obtains the second determination level (threshold) JVL2 by adding the second correction value α2 to the second intermediate value VCT2 between the second peak value VP2 and the first peak value VP1, and sets the second determination level (threshold) JVL2. The peak detector 142 sets the second determination level JVL2 to be at the maximum value side (mountain side) relative to the second intermediate value VCT2 between the second peak value VP2T and the first peak value VP1B. The peak detector 142 determines whether a value of the digital signal from the AD converter 141 has exceeded the second intermediate value VCT2 and the second determination level JVL2 that have been set. Then, the peak detector 142 confirms that a value of the digital signal has exceeded the first intermediate value VCT1 and the first determination level JVL1 that have been set, and also exceeded the second intermediate value VCT2 and the second determination level JVL2 that have been set.

Confirmation of the fact that the digital value has exceeded the first intermediate value VCT1 and the first determination level JVL1, and confirmation of the fact that the digital value has exceeded the second intermediate value VCT2 and the second determination level JVL2 may be carried out separately in succession to the setting process, or continuously.

The peak detector 142 confirms whether a value of the digital signal is changed discretely (increased) from the third peak value VP3B toward the second peak value VP2T, as shown in FIG. 3(A), and exceeded the first intermediate value VCT1 and the first determination level JVL1. Further, the peak detector 142 decides the first peak value VP1B at the point of TEU2 when the peak value is discretely changed (increased) from the first peak value VP1B toward the next peak value (VP4T), and exceeds the second intermediate value VCT2 and the second determination level JVL2.

[Peak Detection Method of Case where First Peak Value to be Determined Corresponds to Maximum-Value-Side Peak Value (Mountain Side)]

Next, a peak detection method of a case where the first peak value to be determined corresponds to the maximum-value-side peak value (mountain side) will be explained with reference to FIG. 3(B).

When the first peak value VP1T to be determined corresponds to the maximum-value-side peak value, the peak detector 142 applies the minimum-value-side second peak value VP2B immediately before the first peak value VP1T, the maximum-value-side third peak value VP3T, which is the second preceding peak value with respect to the first peak value VP1T, and also the next peak value (the fourth peak value) VP4B to the first peak value VP1T to be determined. The peak detector 142 obtains the first correction value α11, which is obtained by multiplying a difference (VP3T−VP2B) between the third peak value VP3T and the second peak value VP2B by a ratio C11 (=1/2″) based on the difference. In parallel with the above, the peak detector 142 obtains and sets the first intermediate value VCT11 between the second peak value VP2B and the third peak value VP3T. Then, the peak detector 142 obtains the first determination level (threshold) JVL11 by subtracting the first correction value α11 from the first intermediate value VCT11 between the third peak value VP3T and the second peak value VP2B, and sets the first determination level (threshold) JVL11. The peak detector 142 sets the first determination level JVL11 to be at the minimum value side (valley side) relative to the first intermediate value VCT11 between the second peak value VP2B and the third peak value VP3T. The peak detector 142 determines whether a value of the digital signal from the AD converter 141 has exceeded the first intermediate value VCT11 and the first determination level JVL11 that have been set.

Further, the peak detector 142 obtains the second correction value α12, which is obtained by multiplying a difference (VP2B−VP1T) between the second peak value VP2B and the first peak value VP1T by a ratio C12 (=1/2″) based on the difference (the absolute value of the difference). In parallel with the above, the peak detector 142 obtains and sets the second intermediate value VCT12 between the second peak value VP2B and the first peak value VP1T. Then, the peak detector 142 obtains the second determination level (threshold) JVL12 by subtracting the second correction value α12 from the first intermediate value VCT12 between the second peak value VP2B and the first peak value VP1T, and sets the second determination level (threshold) JVL12. The peak detector 142 sets the second determination level JVL12 to be at the minimum value side (valley side) relative to the second intermediate value VCT12 between the second peak value VP2B and the first peak value VP1T. The peak detector 142 determines whether a value of the digital signal from the AD converter 141 has exceeded the second intermediate value VCT12 and the second determination level JVL12 that have been set. Then, the peak detector 142 confirms that a value of the digital signal has exceeded the first intermediate value VCT11 and the first determination level JVL11 that have been set, and also exceeded the second intermediate value VCT12 and the second determination level JVL12 that have been set.

Confirmation of the fact that the digital value has exceeded the first intermediate value VCT11 and the first determination level JVL11, and confirmation of the fact that the digital value has exceeded the second intermediate value VCT12 and the second determination level JVL12 may be carried out separately in succession to the setting process, or continuously.

The peak detector 142 confirms whether a value of the digital signal is changed discretely (decreased) from the third peak value VP3T toward the second peak value VP2B, as shown in FIG. 3(B), and exceeded the first intermediate value VCT11 and the first determination level JVL11. Further, the peak detector 142 decides the first peak value VP1T at the point of TEU12 when the peak value is discretely changed (decreased) from the first peak value VP1T toward the next peak value (VP4B), and exceeds the second intermediate value VCT12 and the second determination level JVL12.

Also, as described above, as shown in (C) of FIG. 2 and (D) of FIG. 2, the peak detector 142 obtains time intervals TIV12 to TIV89, . . . and so on, as items of time interval information each defined by two peak points at the front and the back.

In the example of (A) of FIG. 2 to (E) of FIG. 2, the peak detector 142 obtains a time interval between a peak point PK1 and a peak point PK2 as a time interval TIV12. A time interval between the peak point PK2 and a peak point PK3 is obtained as a time interval TIV23. A time interval between the peak point PK3 and a peak point PK4 is obtained as a time interval TIV34. A time interval between the peak point PK4 and a peak point PK5 is obtained as a time interval TIV45. A time interval between the peak point PK5 and a peak point PK6 is obtained as a time interval TIV56. A time interval between the peak point PK6 and a peak point PK7 is obtained as a time interval TIV67. A time interval between the peak point PK7 and a peak point PK8 is obtained as a time interval TIV78. A time interval between the peak point PK8 and a peak point PK9 is obtained as a time interval TIV89.

The peak detector 142 outputs information on the obtained time intervals TIV (12 to 89, . . . ) to the F2F signal generation unit 143 as the information generation unit together with peak point information.

The peak detector 142 has been described in detail above. Next, the structure and function of the F2F signal generation unit 143 as the information generation unit will be described.

The F2F signal generation unit 143 generates a rectangular wave signal of the reproduced signal, which is obtained by waveform shaping performed in accordance with the time interval TIV, which is the time interval information on the peak points detected by the peak detector 142. The F2F signal generation unit 143 inverts the level of the signal to be generated from a first level LVL1 to a second level LVL2, or inverts the same from the second level LVL2 to the first level LVL1, using the information representing the peak point as a trigger. For example, the first level LVL1 is a level corresponding to logic "1", and the second level LVL2 is a level corresponding to logic "0". Alternatively, the opposite level may be employed. The F2F signal generation unit 143 maintains the signal to be generated at the second level LVL2 or the first level LVL1 until the signal reaches the time interval TIV from a peak point serving as the trigger to another peak point. Further, the F2F signal generation unit 143 inverts the level of the signal to be generated from the second level LVL2 to the first level LVL1, or from the first level LVL1 to the second level LVL2, when the signal reaches the time interval TIV between the peak points.

In the F2F signal generation unit 143, an F2F signal is generated as a time interval signal obtained from the two peak points at the front and the back is compared with a count value of an internal counter 1431 which counts a time measurement result of the timer 144, and an F2F signal output is inverted if the compared two match. For example, assuming that certain time interval data b is input, and time interval data at the time of output inversion of the immediately preceding F2F signal is "a", the next inversion time is (a+b). If the aforementioned method is adopted as it is, output may not be made normally when a time difference occurs between the interval time to be input and the output timing of the F2F signal to be output. In order to prevent the above, the F2F signal generation unit 143 includes a buffer 1432 having the function of performing time adjustment. The buffer size is, for example, 16 words (16*16 bits).

An F2F signal generation operation in the F2F signal generation unit 143 will be explained with reference to (A) of FIG. 2 to (E) of FIG. 2. First, a signal is inverted (switched) from the first level LVL1 to the second level LVL2, using the information on the peak point PK1 as the trigger. Since the time interval between the peak point PK1 and the next peak point PK2 is TIV12, during a period of the time interval TIV12, the output signal level is maintained at the inverted level, i.e., the second level LVL2.

As a result of monitoring of the timer 144, when a count value of the internal counter 1431 reaches the period of the time interval TIV12 from the trigger point, the output signal level is inverted from the second level LVL2 to the first level LVL1. Since the time interval between the peak point PK2 and the next peak point PK3 is TIV23, during a period of the time interval TIV23, the output signal level is maintained at the inverted level, i.e., the first level LVL1.

As a result of monitoring of the timer 144, when a count value of the internal counter 1431 reaches a total period of the time intervals TIV12 and TIV23 (TIV12+TIV23) from the trigger point, the output signal level is inverted from the first level LVL1 to the second level LVL2. Since the time interval between the peak point PK3 and the next peak point PK4 is TIV34, during a period of the time interval TIV34, the output signal level is maintained at the inverted level, i.e., the second level LVL2.

As a result of monitoring of the timer 144, when a count value of the internal counter 1431 reaches a total period of the time intervals TIV12, TIV23, and TIV34 (TIV12+TIV23+TIV34) from the trigger point, the output signal level is inverted from the second level LVL2 to the first level LVL1. Since the time interval between the peak point PK4 and the next peak point PK5 is TIV45, during a period of the time interval TIV45, the output signal level is maintained at the inverted level, i.e., the first level LVL1.

As a result of monitoring of the timer 144, when a count value of the internal counter 1431 reaches a total period of the time intervals TIV12, TIV23, TIV34, and TIV45 (TIV12+TIV23+TIV34+TIV45) from the trigger point, the output signal level is inverted from the first level LVL1 to the second level LVL2. Since the time interval between the peak point PK5 and the next peak point PK6 is TIV56, during a period of the time interval TIV56, the output signal level is maintained at the inverted level, i.e., the second level LVL2.

As a result of monitoring of the timer 144, when a count value of the internal counter 1431 reaches a total period of the time intervals TIV12, TIV23, TIV34, TIV45, and TIV56 (TIV12+TIV23+TIV34+TIV45+TIV56) from the trigger point, the output signal level is inverted from the second level LVL2 to the first level LVL1. Since the time interval between the peak point PK6 and the next peak point PK7 is TIV67, during a period of the time interval TIV67, the output signal level is maintained at the inverted level, i.e., the first level LVL1.

As a result of monitoring of the timer 144, when a count value of the internal counter 1431 reaches a total period of the time intervals TIV12, TIV23, TIV34, TIV45, TIV56, and TIV67 (TIV12+TIV23+TIV34+TIV45+TIV56+TIV67) from the trigger point, the output signal level is inverted from the first level LVL1 to the second level LVL2. Since the time interval between the peak point PK7 and the next peak point PK8 is TIV78, during a period of the time interval TIV78, the output signal level is maintained at the inverted level, i.e., the second level LVL2.

As a result of monitoring of the timer 144, when a count value of the internal counter 1431 reaches a total period of the time intervals TIV12, TIV23, TIV34, TIV45, TIV56, TIV67, and TIV78 (TIV12+TIV23+TIV34+TIV45+TIV56+TIV67+TIV78) from the trigger point, the output signal level is inverted from the second level LVL2 to the first level LVL1. Since the time interval between the peak point PK8 and the next peak point PK9 is TIV89, during a period of the time interval TIV89, the output signal level is maintained at the inverted level, i.e., the first level LVL1.

In the F2F signal generation unit 143, the F2F signal is generated as a result of performing the processing as described above, and is output to the demodulating circuit 145.

The F2F signal generation unit 143 includes a FIFO (first-in, first-out) buffer. The F2F signal generation unit 143 outputs an overflow error OFE when overwriting in the FIFO occurs before an output of the F2F signal completes data output due to error detection. Conversely, if the count value of the internal counter 1431 has already passed the time at the time of interval data update, the F2F signal generation unit 143 outputs an underflow error UFE. The F2F signal generation unit 143 outputs the overflow error OFE and the underflow error UFE to the demodulating circuit 145 or the higher-level device 15 directly or via the demodulating circuit 145.

The demodulating circuit 145 converts the F2F signal generated by the F2F signal generation unit 143 into "0" and "1" data, and transfers the converted data to the higher-level device 15. For example, when it is assumed that T represents a bit width for which determination of "0" or "1" has already been carried out, the demodulating circuit 145 determines the bit in question as being logic "1" if a next level inversion (bit inversion) occurs during a bit width of ¾ (or may be ⁵⁄₇, ⅝, etc.) T. The demodulating circuit 145 determines the bit as being logic "0" when a next level inversion does not occur during the ¾T. As described above, since the demodulating circuit 145 performs the "0" and "1" data conversion upon receipt of the F2F signal already generated by the F2F signal generation unit 143, the structure can be greatly simplified as compared to a case where demodulation is performed upon receipt of detection data from the peak detector.

Next, an overall operation of the card reader 10 having the above-described configuration will be described with reference to the flowchart of FIG. 9.

By moving the card MC relatively to the magnetic head (HD) 11, the analog signal S11 is output from the magnetic head 11 (ST31), and the analog signal S11 is amplified in the differential amplifier circuit 12 by an operational amplifier (Op Amp) to an appropriate value (level) (ST32). The amplified analog signal S12 is input to the AD converter 141, and is converted into a digital signal by the AD converter 141 (ST33). The digital signal generated by the AD converter 141 is output to the peak detector 142 as the signal S141. At this time, from the AD converter 141, output is made to the peak detector 142 by including position (time) information formed by the sampling number SPLN according to the sampling process, and values SV(n), . . . , (n+4), . . . of the respective sampling points.

Upon receipt of the digital signal S141 output from the AD converter 141, by the peak detector 142, peak points corresponding to the extreme values (the local maximal value and the local minimal value) of the magnetic data are detected (ST34). In the peak detector 142, the detection threshold, which is the determination level of the waveform at the time of peak detection, is automatically set in accordance with the output level of the AD converter 141. By the above feature, it is possible to adapt to a card MC with varied output without switching the circuit. In the peak detector 142, the magnetic data converted into digital data is first determined by an initial determination level (threshold), and is determined as being a peak when the determination level is exceeded. The next determination level is obtained from the previous peak value. Specifically, a value (correction value, level) α, which is obtained by multiplying a value derived from subtracting a valley digital value (Min) from a mountain digital value (Max) of the waveform, i.e., PtoP=Max−Min, by a certain ratio (=1/2n), for example, is obtained, and also a value (level), which is obtained by adding or subtracting the correction value α to or from the intermediate value VCT between the digital value (Max) and the digital value (Min), is obtained as the determination level JVL, and the obtained values are automatically set.

In the peak detection process, the following process which has been explained with reference to FIGS. 4 to 8 is performed so that the peak detection capability can be maintained even if an offset voltage is changed (ST35).

In the peak detector 142, when the differences (VCT2−VCT1) (VCT12−VCT11) between the first intermediate values VCT1 and VCT11 and the second intermediate values VCT2 and VCT12 are each within the first difference value DF1, the first peak value VP1 (B, T) is decided after confirming that a digital value SV2 corresponding to the second peak value VP2 (B, T) has exceeded the first intermediate values VCT1 and VCT11, and also the first thresholds JVL1 and JVL11, and that the digital value SV4 corresponding to the next peak value VP4 (B, T) has exceeded the first intermediate values VCT1 and VCT11, and also the second thresholds JVL2 and JVL12.

Meanwhile, when the differences (VCT2−VCT1) (VCT12−VCT11) between the first intermediate values VCT1 and VCT11 and the second intermediate values VCT2 and VCT12 are each greater than or equal to the first difference value DF1, a determination process of the first thresholds JVL1 and JVL11 is ignored, and the peak detector 142 decides the first peak value VP1 (B, T) after confirming that the digital value SV4 corresponding to the next peak value VP4 (B, T) has exceeded the second thresholds JVL2 and JVL12.

Note that when a difference between the digital value and the extreme value is not greater than the second difference value DF2 smaller than the first difference value DF1, in the peak detector 142, the digital value is not determined as the peak value even if the digital value exceeds the threshold.

As the peak detector 142 has this function, the peak detection capability can be maintained even in a case where the offset voltage is changed.

Further, in the peak detector 142, peak point time interval (interval) information TIV obtained from a plurality of items of peak point information is acquired, and is output to the F2F signal generation unit 143 as the signal S142 including the peak point information and the time interval information TIV (ST36).

In the F2F signal generation unit 143, the F2F signal is generated by inverting the signal level by using the information representing the peak point as a trigger, and inverting the level every time the time interval period elapses (ST37). In the F2F signal generation unit 143, the F2F signal is generated as a time interval signal obtained from the two peak points at the front and the back is compared with a count value of the internal counter 1431 which counts a time measurement result of the timer 144, and the F2F signal output is inverted if the compared two match. For example, as described above, assuming that certain time interval data b is input, and time interval data at the time of the output inversion of the immediately preceding F2F signal is "a", the next inversion time is (a+b). Here, by the buffer 1432, the time is adjusted so that output can be made normally when a time difference occurs between the interval time to be input and the output timing of the F2F signal to be output.

The F2F signal generated by the F2F signal generation unit 143 is converted into "0" and "1" data by the demodulating circuit 145, and the converted data is transferred to the higher-level device 15 (ST38).

(Modification)

It is to be noted that performance can be improved by adding a circuit as indicated below to the digital reproduction processing circuit 14 including the peak detector.

At least one of a digital filter 146 and a moving average unit 147 can be disposed between output of the AD converter 141 and the peak detector 142 as indicated by a broken line in FIG. 1.

(1) For example, by arranging the digital filter 146 at an output stage of the AD converter 141, a digital filter is applied to digital data before peak detection and after AD conversion for noise removal.

(2) By arranging the moving average unit 147 at the output stage of the AD converter 141, for example, a moving average of the magnetic data after the AD conversion can be obtained in order to remove the noise, and smoothing can be performed.

(3) For example, by arranging the digital filter 146 and the moving average unit 147 at the output stage of the AD converter 141, the moving average can be obtained after applying the digital filter to the magnetic data obtained after the AD conversion in order to remove the noise.

Also, by arranging, for example, a noise pulse removal unit 148 at an output stage of the peak detector 142, a noise pulse shorter than an interval of the normal F2F signal is removed. For example, pulses less than a fraction of the 2F signal are eliminated as noise.

Also, as described above, automatic gain control (AGC) is performed for the gain in the differential amplifier circuit 12. In this case, the differential amplifier circuit 12 differentially amplifies the analog signal S11 reproduced by the magnetic head 11 in accordance with the peak detection information in the peak detector 142 of the digital reproduction processing circuit 14. The differential amplifier circuit 12 performs the gain control so that the amplitude of the signal is set to, for example, a quarter (¼) of a full range.

(Major Effect of Present Embodiment)

As explained above, in the peak detector 142, when differences (VCT2−VCT1) (VCT12−VCT11) between the first intermediate values VCT1 and VCT11 and the second intermediate values VCT2 and VCT 12 are each greater than or equal to the first difference value DF1, the card reader 10 ignores the first thresholds JVL1 and JVL11, and decides the first peak value VP1 (B, T) after confirming that the digital value SV4 corresponding to the next peak value VP4 (B, T) has exceeded the second thresholds JVL2 and JVL12.

By the above feature, according to the card reader 10, it becomes possible to maintain the peak detection capability even in a case where the gain is suddenly increased due to the AGC in a demagnetized card MC, for example, or when the vertical symmetry of the waveform is deteriorated due to a poor head touch in a curved card MC, for example, whereby the offset voltage is changed.

Also, in the peak detector 142, when the differences (VCT2−VCT1) (VCT12−VCT11) between the first intermediate values VCT1 and VCT11 and the second intermediate values VCT2 and VCT12 are each within the first difference value DF1, the first peak value VP1 (B, T) is decided after confirming that the digital value SV2 corresponding to the second peak value VP2 (B, T) has exceeded the first intermediate values VCT1 and VCT11, and also the first thresholds JVL1 and JVL11, and that the digital value SV4 corresponding to the next peak value VP4 (B, T) has exceeded the first intermediate values VCT1 and VCT11, and also the second thresholds JVL2 and JVL12.

In this way, also in a card MC with a large amount of noises, information can be reproduced by reliable handling.

Also, when a difference between the digital value and the extreme value is not greater than a second difference value DF2 smaller than the first difference value DF1, the peak detector 142 is configured not to determine the digital value as the peak value even if the digital value exceeds the threshold.

Consequently, it becomes possible to prevent a noise from being erroneously detected when an output change of AD conversion is small.

With digital peak detection according to the present first embodiment, a threshold of the peak detection can be changed automatically according to an output level of an analog signal. Thus, there is no need to switch a circuit, which means that the size of the circuit can be reduced, and the cost can be reduced. Further, since it is possible to deal with both the card MC with a large amount of noises and the card MC which has been demagnetized by a one-time read, reading time can be reduced. Furthermore, according to the present first embodiment, by digitally generating the F2F signal, speed measurement and jitter measurement can be performed.

Note that an FPGA (Field-Programmable Gate Array) or an ASIC (Application Specific Integrated Circuit) can be incorporated in the digital reproduction processing circuit including the peak detector.

Second Embodiment

FIG. 10 is a block diagram showing a configuration example of an information reproduction apparatus according to a second embodiment of the present invention.

An information reproduction apparatus 10A according to the present second embodiment is different from the card reader 10 as the information reproduction apparatus according to the first embodiment in that a demodulating circuit is not arranged in a digital reproduction processing circuit 14A. In the information reproduction apparatus 10A, the function of the demodulating circuit is provided at the side of a higher-level device 15A.

The other structures are similar to those of the first embodiment, and according to the second embodiment, effects similar to those of the above-described first embodiment can be obtained.

The invention claimed is:

1. An information reproduction apparatus comprising:
   an analog-to-digital (AD) converter which reproduces information recorded on a magnetic recording medium, and converts an analog signal amplified by a predetermined gain into a digital signal;
   a peak detector which detects a peak point of a reproduced signal according to a threshold, which is a determination level made to conform to an output of the AD converter from the digital signal; and
   an information generation unit which generates a rectangular wave signal of the reproduced signal subjected to waveform shaping performed in accordance with interval information on peak points detected by the peak detector, wherein the peak detector includes:
- a first intermediate value acquisition unit which applies, to a first peak value to be determined, a second peak value immediately before the first peak value, a third peak value, which is a second preceding peak value with respect to the first peak value, and a next peak value, and obtains a first intermediate value between the third peak value and the second peak value;
- a second intermediate value acquisition unit which obtains a second intermediate value between the second peak value and the first peak value;
- a first correction value acquisition unit which obtains a first correction value obtained by multiplying a difference between the third peak value and the second peak value by a predetermined ratio based on the difference;
- a first threshold acquisition unit which obtains a first threshold by adding the first correction value to the first intermediate value;
- a second correction value acquisition unit which obtains a second correction value obtained by multiplying a difference between the second peak value and the first peak value by a predetermined ratio based on the difference;
- a second threshold acquisition unit which obtains a second threshold by adding the second correction value to the second intermediate value; and
- a peak value decision unit which ignores the first threshold when a difference between the first intermediate value and the second intermediate value is greater than or equal to a first difference value, and decides the first peak value after confirming that a digital value corresponding to the next peak value has exceeded the second threshold.

2. The information reproduction apparatus according to claim 1, wherein the peak value decision unit of the peak detector decides the first peak value after confirming that the digital value corresponding to the second peak value has exceeded the first threshold, and the digital value corresponding to the next peak value has exceeded the second threshold, when the difference between the first intermediate value and the second intermediate value is within the first difference value.

3. The information reproduction apparatus according to claim 1, wherein when a difference between the digital value and an extreme value is not greater than a second difference value smaller than the first difference value, the peak value decision unit of the peak detector does not determine the digital value as the peak value even if the digital value exceeds the threshold.

4. An information reproduction method comprising:
- an analog-to-digital (AD) conversion step of reproducing information recorded on a magnetic recording medium, and converting an analog signal amplified by a predetermined gain into a digital signal;
- a peak detection step of detecting a peak point of a reproduced signal according to a threshold, which is a determination level made to conform to an output of the AD conversion step from the digital signal; and
- an information generation step of generating a rectangular wave signal of the reproduced signal subjected to waveform shaping performed in accordance with interval information on the peak points detected by the peak detection step, wherein the peak detection step comprises:
- applying, to a first peak value to be determined, a second peak value immediately before the first peak value, a third peak value, which is a second preceding peak value with respect to the first peak value, and a next peak value;
- obtaining a first intermediate value between the third peak value and the second peak value;
- obtaining a second intermediate value between the second peak value and the first peak value;
- obtaining a first correction value obtained by multiplying a difference between the third peak value and the second peak value by a predetermined ratio based on the difference;
- obtaining a first threshold by adding the first correction value to the first intermediate value;
- obtaining a second correction value obtained by multiplying a difference between the second peak value and the first peak value by a predetermined ratio based on the difference;
- obtaining a second threshold by adding the second correction value to the second intermediate value; and
- ignoring the first threshold when a difference between the first intermediate value and the second intermediate value is greater than or equal to a first difference value, and deciding the first peak value after confirming that a digital value corresponding to the next peak value has exceeded the second threshold.

5. The information reproduction method according to claim 4, wherein in the peak detection step, the first peak value is decided after confirming that the digital value corresponding to the second peak value has exceeded the first threshold, and the digital value corresponding to the next peak value has exceeded the second threshold, when the difference between the first intermediate value and the second intermediate value is within the first difference value.

6. The information reproduction method according to claim 4, wherein in the peak detection step, when a difference between the digital value and an extreme value is not greater than a second difference value smaller than the first difference value, the digital value is not determined as the peak value even if the digital value exceeds the threshold.

7. The information reproduction apparatus according to claim 2, wherein when a difference between the digital value and an extreme value is not greater than a second difference value smaller than the first difference value, the peak value decision unit of the peak detector does not determine the digital value as the peak value even if the digital value exceeds the threshold.

8. The information reproduction method according to claim 5, wherein in the peak detection step, when a difference between the digital value and an extreme value is not greater than a second difference value smaller than the first difference value, the digital value is not determined as the peak value even if the digital value exceeds the threshold.

* * * * *